United States Patent [19]
Kurihara et al.

[11] Patent Number: 5,461,129
[45] Date of Patent: Oct. 24, 1995

[54] TETRAFLUOROETHYLENE-PERFLUOROVINYLETHER COPOLYMER

[75] Inventors: Satoshi Kurihara, Takahagi; Hiroaki Murata, Kitaibaraki; Haruyoshi Tatsu, Hitachi, all of Japan

[73] Assignee: Nippon Mektron, Limited, Tokyo, Japan

[21] Appl. No.: 279,875

[22] Filed: Jul. 25, 1994

[30] Foreign Application Priority Data

Oct. 29, 1993 [JP] Japan .................. 5-294493

[51] Int. Cl.$^6$ .................................................. C08F 16/24
[52] U.S. Cl. ................................................... 526/247
[58] Field of Search ........................................... 526/247

[56] References Cited

FOREIGN PATENT DOCUMENTS

| 0193963 | 9/1986 | European Pat. Off. | 526/247 |
| 0224037 | 6/1987 | European Pat. Off. | 526/247 |
| 0359147 | 3/1990 | European Pat. Off. | 526/247 |

*Primary Examiner*—Joseph L. Schofer
*Assistant Examiner*—N. Sarofin
*Attorney, Agent, or Firm*—Lowe, Price, LeBlanc & Becker

[57] ABSTRACT

Tetrafluoroethylene-perfluorovinylether copolymer having a specific melt viscosity of $30 \times 10^4$ to $200 \times 10^4$ poises at 372° C., which comprises 99% to 90% by weight of tetrafluoroethylene and 1% to 10% by weight of perfluoro(ethyl vinyl ether) can produce a film or sheet having good resistance to flex fatigue by molding.

4 Claims, No Drawings

TETRAFLUOROETHYLENE-PERFLUOROVINYLETHER COPOLYMER

BACKGROUND OF THE INVENTION

1. Field of the Invention

The present invention relates to a tetrafluoroethylene-perfluorovinylether copolymer, and more particularly to a tetrafluoroethylene-perfluorovinylether copolymer capable of forming a film or sheet having a good resistance to flex fatigue by molding.

2. Description of the Prior Art

Various tetrafluoroethylene-perfluoro(lower alkyl vinyl ether) copolymers are well known, and most of them relate to copolymers of perfluoro(methyl vinyl ether) or perfluoro(propyl vinyl ether) and tetrafluoroethylene. No extensive studies of tetrafluoroethylene-perfluoro(ethyl vinyl ether) copolymer have been made yet. It is also said that the so far obtained tetrafluoroethylene-perfluoro(ethyl vinyl ether) coplymers are brittle and are not suitable for formation of films or sheets.

SUMMARY OF THE INVENTION

An object of the present invention is to provide a tetrafluoroethylene-perfluoro(ethyl vinyl ether) copolymer capable of forming a film or sheet having a good resistance to flex fatigue by molding.

DETAILED DESCRIPTION OF THE INVENTION

According to the present invention, there is provided a tetrafluoroethylene-perfluorovinylether having a specific melt viscosity of $30 \times 10^4$ to $200 \times 10^4$ poise at 372° C., which comprises 99% to 90% by weight of tetrafluoroethylene and 1% to 10% by weight of perfluoro(ethyl vinyl ether).

Copolymerization reaction tetrafluoroethylene and perfluoro(ethyl vinyl ether) is carried out by emulsion polymerization, suspension polymerization, solution polymerization or the like, where a perfluoro organic peroxide such as $C_3F_7COOOCOC_3F_7$, $Cl(CF_2)nCOOOCO(CF_2)nCl$ (n:1 to 10), etc. is preferably used as an initiator for the copolymerization reaction. An inorganic peroxide such as ammonium persulfate, etc. can be also used as the initiator, and a redox system can be used together with a reducing agent, when required. Furthermore, such a chain transfer agent such as alcohols, hydrocarbons, halogenohydrocarbons, esters, ketones, etc. can be also used. In the emulsion polymerization or suspension polymerization, ammonium perfluoroalkylcarboxylate, sodium or potassium perfluoroalkylsulfonate, etc. can be used as an emulsifying agent.

It is preferable to carry out copolymerization reaction at a temperature of about 40° to about 100° C. under a pressure of about 5 to 30 kg/cm$^2$. After the end of copolymerization reaction, unreacted gas is purged from the pressure reactor vessel, and the resulting reaction mixture is filtered, washed and dried, whereby the product copolymer is obtained.

The thus obtained copolymer is molded into a film or sheet having a thickness of about 0.1~ about 5 mm according to such a molding procedure as pressure hot pressing, etc. Content of perfluoro(ethyl vinyl ether) in the copolymer must be within a range of 1% to 10% by weight, preferably 2% to 7% by weight. A film or sheet molded from the copolymer having a content below 1% by weight of perfluoro(ethyl vinyl ether) has a poor resistance to flex fatigue shown by a bending life, whereas a film or sheet molded from the copolymer having a content above 10% by weight of perfluoro(ethyl vinyl ether) has a low heat resistance. Furthermore, the copolymer must have a specific melt viscosity of $30 \times 10^4$ to $200 \times 10^4$ poise at 372° C., as determined in a procedure as will be described later. That is, below $30 \times 10^4$ poises, a film or sheet has a poor resistance to flex fatigue, whereas above $200 \times 10^4$ poise the copolymer has a higher melt viscosity and a poor moldability, though a film or sheet has a higher resistance to flex fatigue. Adjustment of the specific melt viscosity to the above-mentioned range can be made by appropriate molecular weight adjustment by changing the reaction conditions (amounts of a chain transfer agent and an initiator, polymerization temperature, polymerization time, etc.).

The present tetrafluoroethylene-perfluoro(ethyl vinyl ether) copolymer can give a good resistance to flex fatigue when molded into a film or sheet, and thus can effectively produce insulating films, mold-release films, corrosion-protective films, which can satisfy the heat-resistant and chemical-resistant requirements.

PREFERRED EMBODIMENTS OF THE INVENTION

The present invention will be explained in detail, referring to Examples and Comparative Examples.

Comparative Example 1

Into a degasified stainless steel autoclave having a net capacity of 3 liters, provided with a stirrer, were charged 754.0 g of desalted, deoxygenated water, 713.3 g of perfluoro(2-butyltetrahydrofuran) as a solvent, 12.0 g of perfluoro(ethyl vinyl ether) and 105.0 g of methanol. Then, the autoclave was heated at 50° C., and tetrafluoroethylene was continuously charged into the autoclave until the autoclave pressure reached 9.0 kg/cm$^2$.

Then, 7.4 g of a 5 wt.% bis-perfluorobutyryl peroxide, $C_3F_7COOOCOC_3F_7$ in R-113 (1,2,2-trichloro-1,1,2-trifluoroethane) was added to the autoclave to initiate polymerization reaction. The autoclave pressure was lowered as the reaction proceeded, and thus tetrafluoroethylene was additionally supplied to the autoclave to maintain the polymerization pressure. In the course of polymerization, the solution of the polymerization initiator was added to the autoclave in an amount of less than a half of the initially added amount dividedly from time to time in total of several runs.

When the total charge of tetrafluoroethylene reached 180 g, that is, 200 minutes after the start of polymerization, the supply of tetrafluoroethylene was discontinued, and unreacted gas was purged from the autoclave. Then, the resulting copolymer was discharge from the autoclave, dried under reduced pressure, washed with water, filtered and dried in an oven, whereby 168.1 g the copolymer was obtained (yield: 55.3%).

Examples 1 to 4

In Comparative Example 1, the amounts (g) of perfluoro(ethyl vinyl ether) (PEVE), methanol and initiator, and the polymerization time (min.) were changed as in the following Table 1, and copolymers were obtained in yields (%) given in the following Table 1, respectively.

TABLE 1

| Example | PEVE  | MeOH  | Initiator | Polymerization time | Yield |
|---------|-------|-------|-----------|---------------------|-------|
| 1       | 36.0  | 68.0  | 1.27      | 183                 | 61.7  |
| 2       | 44.0  | 105.0 | 0.64      | 164                 | 57.5  |
| 3       | 36.0  | 34.5  | 2.29      | 220                 | 51.0  |
| 4       | 100.0 | 34.5  | 0.54      | 179                 | 49.3  |

Properties of the copolymers obtained in Comparative Example 1 and Examples 1 to 4 were determined according to the following procedures, among which determination of melting point, specific melt viscosity and MIT bending life were made according to the procedures disclosed in JP-A-58-189210.

Copolymer composition was calculated from results of infrared absorption spectra on the basis of the following formula according to a procedure for determining a perfluoro(propyl vinyl ether) content in tetrafluoroethylene-perfluoro(propyl vinyl ether) copolymer (JP-B-48-2223):

$$\text{Perfluoro(ethyl vinyl ether) content (\% by weight)} = \frac{\text{Net absorption at } 10.07\mu}{\text{Net absorption at } 4.25\mu} \times 0.95$$

Melting point was determined as a maximum value of melting curve of copolymer when heated from room temperature at a temperature elevation rate of 10° C./min., using a melting point meter, type SSC/5200, made by Seiko Denshi K.K., Japan.

Specific melt viscosity was determined by a melt indexer, made by Toyo Seiki K.K., Japan, by placing copolymer into a cylinder, 9.5 mm in inner diameter, keeping the cylinder at 372° C. for 5 minutes, then extruding the copolymer through an orifice, 2.095 mm in inner diameter and 8.00 mm in length, under a piston load of 5 kg, and dividing the extrusion rate (g/min.) at that time by 53/50.

MIT bending life was determined by a standard flex durability tester disclosed in ASTM D-1276-63T by setting a test film piece, about 90×about 12.5×about 0.2 mm, molded under pressure at 380° C., to the chuck of the tester, flexing the test film piece laterally at an angle of 135° and about 175 cycles/min. under a load of 1.25 kg, while recording the number of cycles up to breakage, and making an average of two determinations as MIT bending life.

The results of determinations are shown in the following Table 2, together with the properties of tetrafluoroethyleneperfluoro(propyl vinyl ether) copolymer, commercially available product AP-210, from Daikin K.K., Japan, as Comparative Example 2.

TABLE 2

|              | Copolymer composition (%) | Melting point (°C.) | Specific melt viscosity (× $10^4$ poises) | Bending life (cycles) |
|--------------|---------------------------|---------------------|-------------------------------------------|-----------------------|
| Comp. Ex. 1  | 0.39                      | 316.8               | 38.0                                      | 600                   |
| Example 1    | 1.61                      | 306.8               | 50.6                                      | 200,000               |
| Example 2    | 2.29                      | 300.9               | 35.7                                      | 400,000               |
| Example 3    | 1.31                      | 308.8               | 121.0                                     | 1,110,000             |
| Example 4    | 6.92                      | 277.3               | 116.0                                     | >1,800,000            |
| Comp. Ex. 2  | 3.10                      | 307.0               | 37.0                                      | 10,000                |

What is claimed is:

1. A film or sheet article molded from a tetrafluoroethylene-perfluorovinylether copolymer having a specific melt viscosity of $30 \times 10^4$ to $200 \times 10^4$ poise at 372° C., which comprises 99% to 90% by weight of tetrafluoroethylene and 1% to 10% by weight of perfluoro(ethyl vinyl ether).

2. An article according to claim 1, wherein said film or sheet has a thickness of between about 0.1 to 5.0 mm.

3. An article according to claim 1, wherein said film or sheet has an MIT bending life of more than 200,000.

4. An article according to claim 1, wherein said tetrafluoroethylene-perfluorovinylether copolymer comprises 98% to 93% by weight of tetrafluoroethylene and 2% to 7% by weight of perfluoro(ethyl vinyl ether).

* * * * *